Feb. 23, 1943. R. E. DRACHENBERG 2,312,241
MOTOR SPEED CONTROL DEVICE
Filed Jan. 8, 1942
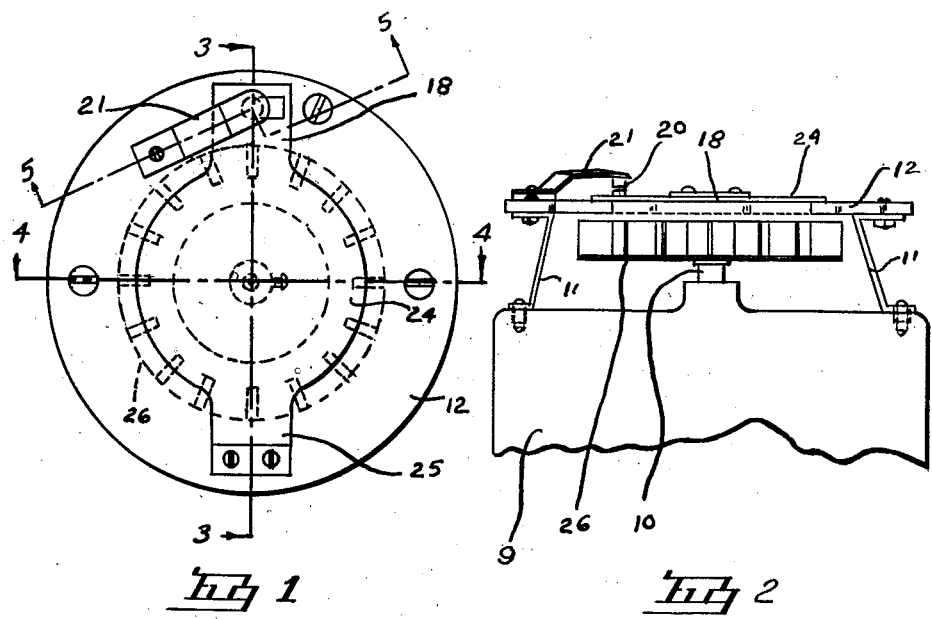
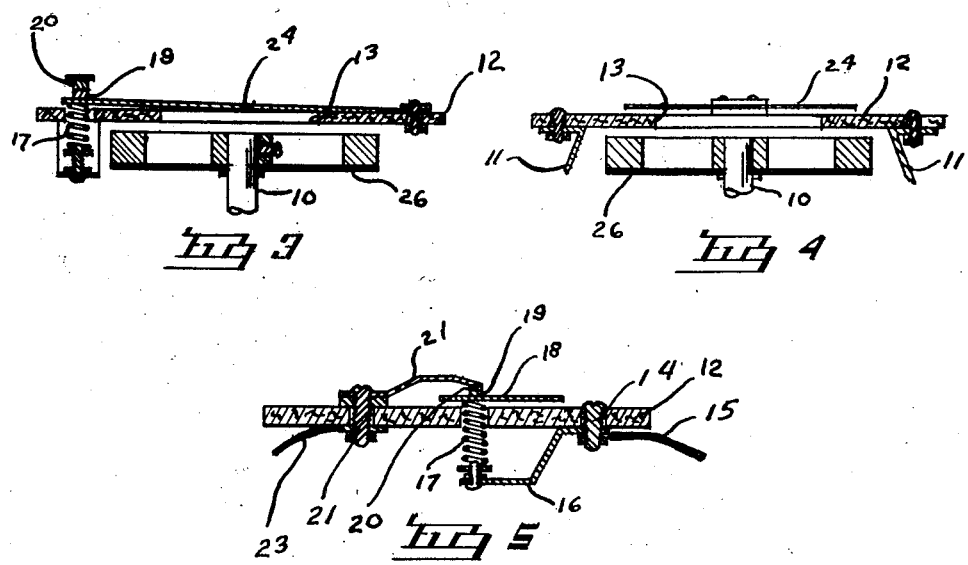
INVENTOR.
Richard E. Drachenberg
BY Thos. L. Donnelly
attorney Patented Feb. 23, 1943

2,312,241

UNITED STATES PATENT OFFICE 2,312,241

MOTOR SPEED CONTROL DEVICE

Richard E. Drachenberg, Grosse Pointe Park, Mich.

Application January 8, 1942, Serial No. 426,037

8 Claims. (Cl. 171—222)

My invention relates to a new and useful improvement in an electric motor and has for its object the provision of a structure whereby the speed of the motor may be maintained constant regardless of the load placed thereon.

It is another object of the present invention to provide in an electric motor a make and break mechanism movable in response to variation of air pressure for making and breaking the circuit so as to maintain the motor running at constant speed.

Another object of the invention is the provision of a mechanism responsive to variation in air pressure whereby the circuit will be broken to the motor in the event the motor should attempt to speed up beyond a predetermined speed.

Another object of the invention is the provision of an electric motor having a fan adapted for operating upon a movable make and break mechanism whereby the mechanism may alternatively be operated to make and break the circuit to the motor while the motor is operating.

Another object of the invention is the provision of a make and break mechanism responsive to a vacuum and movable in response to the vacuum and disestablishing the vacuum.

Other objects will appear hereinafter. It is recognized that various modifications and changes may be made in the invention without departing from the spirit thereof, and it is intended that such variations shall be embraced within the scope of the claims forming a part hereof.

Forming a part of this specification is a drawing in which:

Fig. 1 is a top plan view of the invention.

Fig. 2 is a fragmentary view of an electric motor showing the invention applied.

Fig. 3 is a sectional view taken on line 3—3 of Fig. 1.

Fig. 4 is a sectional view taken on line 4—4 of Fig. 1.

Fig. 5 is a sectional view taken on line 5—5 of Fig. 1.

As shown in the drawing, an electric motor 9 is provided with a shaft 10 which is driven thereby. Mounted on the motor 9 are supporting brackets 11 which serve to support a disc 12 having a central opening 13 formed therein. Mounted on the disc 12 is a terminal 14 to which is attached a wire 15 forming a part of the circuit to the motor 9. Connected to the terminal 14 is a bracket 16 carrying a spring 17 which is adapted to bear against the metal tongue 18 having a contact member 19 formed thereon. This contact member 19 is normally in engagement with the contact 20 carried by the metal arm 21 which is connected to the terminal 22 to which is also connected the wire 23 forming a part of the circuit to the motor. The construction is such that when the contacts 19 and 20 are spaced apart, the circuit to the motor is broken, and when these contacts are in engagement, the circuit is made. The metal tongue 18 forms an extension of the resilient plate 24 which is provided with the diametrically opposite tongue 25 which is secured to the disc 12. This plate 24 is normally flexed so that it is in elevated relation at its free end to the disc 12 so as to maintain the contact 19 in engagement with the contact 20. It will be noted that the plate 24 is enlarged intermediate its ends and of larger diameter than the opening 13. Fixedly mounted on and driven by the shaft 10 is a fan 26.

When the motor 9 is started and the fan 26 rotated, the fan draws air downwardly through the opening 13. This establishes a suction or a partial vacuum with the result that the plate 24 is flexed downwardly so that it lies, throughout the area of its lower face, flat on the upper face of the disc 12 and serves as a closure for the opening 13. It is believed that this movement is due to a partial vacuum rather than to a suction because of the action which immediately follows the closing of the opening 13. When the plate 24 moves downwardly to close the opening 13, the contacts 19 and 20, of course, separate so that the circuit to the motor 9 is broken. As soon as the opening 13 is closed, the force acting on the plate 24 forcing it downwardly into opening and closing position is removed or relieved and the plate 24 immediately, in response to either its own resiliency or the pressure of the spring 17, springs back into the position shown in Fig. 3 so that the contacts 19 and 20 are again engaged and the circuit to the motor again established. This movement would, of course, become much more rapid as the speed of the motor is increased, and the breaking of the circuit would become more frequent.

Experience has shown that such a mechanism is very effective in maintaining a motor travelling at a constant speed regardless of the load placed thereon. In order to break the circuit a predetermined speed is necessary. As the load is increased, the effect would be a tendency to slow down the motor but under such circumstances the circuit would remain closed sufficiently long without interruption to build up the speed of the motor. Should the motor attempt to speed up, the interruptions to the circuit would, of course, become much more frequent with the result that speeding up would be prevented.

What I claim as new is:

1. In combination, an electric motor; a fan driven by said motor; a make and break mechanism; and means for moving said make and break mechanism to breaking position upon development of a predetermined suction by said fan and for removing said suction upon breaking of said circuit.

2. In combination with an electric motor; an opening bearing member; a movable closure for said opening; a make and break mechanism actuated by said closure and normally held by said closure in making position and moved to breaking position upon movement of said closure to closing position; and a fan driven by said motor for drawing air through said opening and effecting a movement of said closure to opening-closing position.

3. In combination with an electric motor, an electric circuit for operating said motor; a make and break mechanism in said circuit; an opening bearing member; a closure for the opening in said opening bearing member and movable to closing and non-closing position and adapted upon movement for operating said make and break mechanism and effecting a movement of said make and break mechanism to breaking position upon movement of said closure to closing position; and means for drawing air through said opening and moving said closure to closing position.

4. In combination with an electric motor, an electric circuit therefor; make and break mechanism in said circuit; an opening bearing member; a movable closure movable into closing and non-closing position relatively to the opening in said opening bearing member; and adapted for actuating said make and break mechanism for making said circuit upon movement to non-closing position and breaking said circuit upon movement to closing position; and means for drawing air through said opening for effecting a movement of said closure to closing position.

5. In combination, an electric motor; an electric circuit for said motor; a make and break mechanism for said circuit; an opening bearing member having an opening formed therein; a movable closure movable into closing position and non-closing position relatively to said opening for actuating said make and break mechanism into circuit making position upon movement of said closure to non-closing position and into circuit breaking position upon movement of said closure into closing position; and means for drawing air through said opening for moving said closure to closing position.

6. In combination, an electric motor; an electric circuit for said motor; a make and break mechanism for said circuit; an opening bearing member having an opening formed therein; a movable closure movable into closing position and non-closing position relatively to said opening for actuating said make and break mechanism into circuit making position upon movement of said closure to non-closing position and into circuit breaking position upon movement of said closure into closing position; means for drawing air through said opening for moving said closure to closing position; and resilient means for normally retaining said closure in non-closing position.

7. In combination, an electric motor; an electric circuit for said motor; a make and break mechanism for said circuit; an opening bearing member having an opening formed therein; a movable closure movable into closing position and non-closing position relatively to said opening for actuating said make and break mechanism into circuit making position upon movement of said closure to non-closing position and into circuit breaking position upon movement of said closure into closing position; means for drawing air through said opening for moving said closure to closing position; and resilient means for normally retaining said closure in non-closing position and of sufficient strength for moving said closure from closing position to non-closing position.

8. In combination, an electric motor; an electric circuit for said motor; a make and break mechanism for said circuit; an opening bearing member having an opening formed therein; a movable closure movable into closing position and non-closing position relatively to said opening for actuating said make and break mechanism into circuit making position upon movement of said closure to non-closing position and into circuit breaking position upon movement of said closure into closing position; means for producing a suction of said closure for, upon development of said suction to a predetermined degree, moving said closure to closing position for effecting a movement of said make and break mechanism into breaking position and reducing the suction on said closure; and a resilient means for normally retaining said closure in non-closing position and of sufficient strength for moving said closure from closing position to non-closing position upon reducing of said suction upon said closure to a predetermined degree.

RICHARD E. DRACHENBERG.